(12) United States Patent
Skogerson et al.

(10) Patent No.: US 7,687,096 B2
(45) Date of Patent: Mar. 30, 2010

(54) NON-HYDROGENATED VEGETABLE OIL BASED MARGARINE FOR PUFF PASTRY CONTAINING AN ELEVATED DIGLYCERIDE EMULSIFIER

(75) Inventors: Lawrence Skogerson, Mission Hills, KS (US); Troy Boutté, Overland Park, KS (US); Jim Robertson, Kansas City, MO (US); Fan Zhang, Overland Park, KS (US)

(73) Assignee: Caravan Ingredients Inc., Lenexz, KS (US)

( * ) Notice: Subject to any disclaimer, the term of this patent is extended or adjusted under 35 U.S.C. 154(b) by 552 days.

(21) Appl. No.: 11/279,730

(22) Filed: Apr. 13, 2006

(65) Prior Publication Data

US 2007/0148313 A1 Jun. 28, 2007

Related U.S. Application Data

(60) Provisional application No. 60/754,269, filed on Dec. 28, 2005.

(51) Int. Cl.
*A23D 7/00* (2006.01)
(52) U.S. Cl. ........................ 426/604; 426/607
(58) Field of Classification Search ................. 426/601
See application file for complete search history.

(56) References Cited

U.S. PATENT DOCUMENTS

| | | | | |
|---|---|---|---|---|
| 3,278,314 | A | | 10/1966 | Colby et al. |
| 4,018,806 | A | * | 4/1977 | Wyness et al. ............... 554/209 |
| 4,263,216 | A | * | 4/1981 | Volpenhein ................. 554/164 |
| 4,656,045 | A | * | 4/1987 | Bodor et al. ................. 426/601 |
| 5,160,759 | A | | 11/1992 | Nomura et al. |
| 5,409,723 | A | * | 4/1995 | Okutomi et al. ............. 426/559 |
| 5,470,598 | A | * | 11/1995 | Scavone ...................... 426/607 |
| 5,912,042 | A | * | 6/1999 | Cain et al. ................... 426/607 |
| 6,022,579 | A | | 2/2000 | Mori et al. |
| 6,033,703 | A | * | 3/2000 | Roberts et al. .............. 426/312 |
| 6,106,879 | A | | 8/2000 | Mori et al. |
| 2002/0128500 | A1 | | 9/2002 | Kolstad et al. |
| 2004/0209953 | A1 | | 10/2004 | Lee |
| 2005/0026999 | A1 | | 2/2005 | Faergemand et al. |
| 2005/0214436 | A1 | | 9/2005 | Doucet |

OTHER PUBLICATIONS

Gunstone, F. 1083. Lipids in Foods. Chemistry, Biochemistry and Technology. Pergamon Press. New York, p. 149.*
Hui, Y. H. editor. 1996. Baileys Industrial Oil and Fat Products. 5th edition, vol. 3, p. 80-82.*
Oct. 30, 2008 Office Action in U.S. Appl. No. 11/279,728.
Oct. 2, 2007 International Search Report and Written Opinion in PCT/US06/49188.
Oct. 29, 2008 International Preliminary Report on Patentability in PCT/US06/49188.
Aug. 22, 2007 International Search Report and Written Opinion in corresponding application PCT/US06/16299.
Feb. 13, 2009 International Preliminary Report on Patentability in corresponding application PCT/US06/16299.
Office Action dated May 1, 2009 in U.S. Appl. No. 11/279,728.
Office Action dated Jan. 22, 2009 in U.S. Appl. No. 11/279,733.

* cited by examiner

*Primary Examiner*—Carolyn A Paden
(74) *Attorney, Agent, or Firm*—Hovey Williams LLP

(57) ABSTRACT

A mono-, di-, and triglyceride emulsifier is provided that is obtained by the interesterification or glycerolysis of triglycerides with glycerol. The diglyceride portion w/w is at least about 65% to about 80%, and most preferably from about 70% to about 80%. The high diglyceride emulsifier is useful in preparing a margarine from a selected quantity a non-hydrogenated vegetable oil and from an amount of saturated fat for use in puff pastry products. The puff pastry is trans fat free and a less than usual percentage of saturated fats. A preferred structured puff pastry margarine is prepared by mixing on a weight to weight basis about 14 parts of the high diglyceride emulsifier that is in predominantly stable beta crystal form, from about 14 to 27 parts of a non-hydrogenated vegetable oil, and from about 40 to about 52 parts of a saturated fat.

5 Claims, 2 Drawing Sheets

NON-HYDROGENATED VEGETABLE OIL BASED MARGARINE FOR PUFF PASTRY CONTAINING AN ELEVATED DIGLYCERIDE EMULSIFIER

RELATED APPLICATION

The present non-provisional patent application claims, with regard to all common subject matter, priority benefit of a provisional patent application titled ELEVATED DIGLYCERIDE EMULSIFIER COMPOSITION, SHORTENING, PUFF PASTRY MARGARINE AND PEANUT BUTTER CONTAINING THE EMULSIFIER COMPOSITION; U.S. patent application Ser. No. 60/754,269; filed Dec. 28, 2005. The identified provisional patent application is hereby incorporated by reference into the present non-provisional patent application.

BACKGROUND OF THE INVENTION

1. Field of the Invention

This invention relates to a glyceride emulsifier having an elevated diglyceride portion that is especially useful in preparing puff pastry products. The high diglyceride emulsifier is obtained by the interesterification or glycerolysis of triglycerides with glycerol. Triglyceride reacts with glycerol at high temperatures, for example 200-250° C. under alkaline catalysis, yielding a mixture of mono-, di-, and triglycerides, and a small portion of unreacted glycerol. Commercial mono- and diglycerides usually contain 40-60% monoglycerides, 38-45% diglycerides, 8-12% triglycerides, and 1-7% free glycerol. In accordance with this invention, the diglyceride portion w/w is increased to at least about 65% to about 80%, more preferably from about 70% to about 80%, and most preferably to about 74% for example, by vacuum distillation, with the remaining monoglyceride portion being about 10% and the triglyceride portion of the order of 15%. Alternatively, the glycerine to fat ratio is selected to yield the required elevated diglyceride portion.

The high diglyceride emulsifier (herein "HiDi") is particularly useful in the production of a semi-solid, self-sustaining trans fat free puff pastry margarine prepared from initially liquid non-hydrogenated vegetable oil. Puff pastry bakery goods prepared using the margarine have significantly lower saturated fat content and a substantially higher polyunsaturated fat level than puff pastry prepared from heretofore available mono- and diglyceride emulsifiers.

2. Description of the Prior Art

Puff pastries require the inclusion of a fat-continuous emulsion such as margarine. For use in preparing a puff pastry, the margarine must have certain specific structural characteristics, such as predetermined plasticity, dispersibility, and solid fat content profile, i.e., the percent solid fat present at different temperatures.

In the past natural products such as butter or lard were used as the fat-continuous emulsion for preparation of puff pastry products. For a number of reasons including availability and cost, margarines have more recently been produced from vegetable oils. Since vegetable oils are liquids, they must be given structure by the introduction of solid fat in order to achieve the desired plasticity and solid fat content profile required for functionality. A number of approaches have been employed for generating the solid fatty materials needed to achieve the desired solid fat content profile for the particular temperatures required in puff pastry processing. Two approaches that have been widely practiced in the past involved the partial hydrogenation of the vegetable oil, and/or the addition of solid fatty materials. Oil and solid fat blends have been interesterified to further improve functionality. When a solid fatty material is to be added, that material can be obtained either by hydrogenation of a fat or oil or by fractionation of solid fat from a naturally occurring fat. These approaches are well known among those skilled in the art of preparing fat-continuous emulsions such as margarines.

The structured fats used in the production of fat-continuous emulsions contain saturated fatty acids and unsaturated fatty acids. Naturally occurring unsaturated fatty acids have carbon-carbon double bonds in a cis-configuration. Partial hydrogenation of fat can cause isomerization with some of the carbon-carbon double bonds of the cis-unsaturated fatty acids being converted to the trans configuration. Until recently, trans fatty acids were nutritionally categorized along with cis fatty acids as unsaturated fatty acids without the demonstrated negative health consequences of saturated fatty acids. However, a great deal of research has recently implicated trans fat in the development of cardiovascular disease. Thus, the National Academy of Medicine and many nutritionists have advised that consumption of trans fats be limited as much as possible within the needs of a nutritionally adequate diet. Minimizing the presence of trans fatty acids in the diet requires that the efficient and economically advantageous practice of partial hydrogenation be greatly reduced. Therefore, there is a need for alternative approaches that will permit the structuring of fats for use in fat-continuous emulsions such as margarines without introducing trans fatty acids or increasing the content of saturated fatty acids.

Puff pastries can contribute very significant levels of trans fat to the diets of consumers. This is because the pastries themselves contain 30% or more of fat. The fat compositions used to prepare puff pastry margarine usually have a trans fat content of from 25-35% so that pastries made from such a margarine contain at least about 7.5-10% trans fat.

SUMMARY OF THE INVENTION

It has now been found that emulsifiers such as HiDi have unique characteristics capable of adding sufficient structure to a non-hydrogenated vegetable oil to form a semi-solid, self-sustaining base, for use in conjunction with a less than usual quantity of saturated fat, to prepare a trans free puff pastry margarine. The improved trans free, lower saturated fat margarine is equal to or better than prior margarines that combined trans-containing partially hydrogenated fats with a normal amount of saturated fats.

The emulsifiers that produce this effect are mono- and diglycerides produced from fully saturated fat sources and that have a higher than usual content of diglycerides, i.e., to at least about 65% to about 80%, more preferably from about 70% to about 80%, and most preferably about 74% of diglycerides. The emulsifier having a higher than usual level of diglycerides functions as well as or better than a standard stabilizer produced from partially hydrogenated cotton seed or soybean oil. Because the emulsifiers are particularly effective in structuring vegetable oils at low levels of the emulsifier, the desired characteristics of the resulting margarine are achieved using less than usual saturated fat and without the use of partially hydrogenated fat containing trans fatty acids. The margarine emulsifier can advantageously be used to produce puff pastry food products without the attendant negative effects on cardiovascular health of similar products produced with currently available fat-continuous emulsions.

Puff pastry is an expanded, flaky, baked product best known for making turnovers, pastry shells, creme horns, etc. It is prepared from a puff pastry composition made up of flour, salt, and cold water that is layered with margarine to form a tough but pliable puff pastry dough. The margarine is applied by hand or extruded onto sheeted dough, which is then folded, resheeted, and refolded several times to form thin interleaved layers of fat and dough. A typical product will be folded and resheeted enough times to form from 100 to more than 1000 individual layers.

Preferably, the puff pastry margarine is prepared by admixing, on a w/w basis, from about 10% to about 16% of the HiDi emulsifier, from about 55% to about 65% of vegetable oil, and from about 13% to about 25% of saturated fat. The blended margarine is of desired consistency and is especially adapted for puff pastry recipes.

Puff pastry margarine has several functions in the final product. Typically about 4-15% of the margarine is incorporated into the dough to provide lubrication during the lamination process. The remaining portion of the margarine is laminated into the product to keep the layers of dough separated. During baking moisture from the dough and/or margarine is vaporized to lift and separate the layers to generate the typical flaky texture of the final baked product. Key performance characteristics for puff pastry margarines include:

1. The margarine must retain its plasticity over the temperature range that will be experienced during the lamination process.
2. The consistency of the margarine must be equivalent to that of the dough at lamination temperatures.
3. The melting temperature for margarine must be high enough that the margarine is not incorporated into the dough during the lamination process.
4. A beta prime crystal tendency is necessary to provide small crystals that immobilize large amounts of liquid oil in the product.

Plasticity of puff pastry margarines is understood to mean that the margarine will remain pliable during lamination so that a continuous layer of fat will be maintained to separate the layers of dough. If non-plastic or brittle margarines were used, they would form uneven layers of fat and could damage the thin layers of dough, thereby causing loss of steam vapor and resulting in low volume and dense texture of the baked product. Margarine that is too soft will simply be incorporated into the dough such that the layers will no longer be kept separate, thus leading to low volume of the baked product. After baking, the solid fat in the margarine should crystallize in the small beta prime configuration so that the oily portion will be immobilized and not produce an unpleasant oily eating characteristic. Partially hydrogenated fats and oils have been found to be particularly useful in achieving the required characteristics of puff pastry margarines at reasonable manufacturing costs. The use of partially hydrogenated oils, however, leads to the presence of trans fat, now a widely recognized contributor to cardiovascular disease.

Generally, puff pastry products contain equal quantities of saturated fat so the total of trans fat plus saturated fat can be as high as from 15% to 20% of the puff pastry. Therefore, it is desirable that the trans fat level of puff pastry products be reduced without unduly increasing the saturated fat content. The sum of trans fat plus saturated fat should not increase and if possible should decrease.

Traditionally, the fat solids of margarines have comprised a mixture of saturated fatty acids, trans fatty acids and unsaturated fatty acids. Generally, fats containing fatty acids with chain lengths from $C_{12}$ to $C_{22}$ have been used for preparing mono- and diglyceride emulsifiers, but the most common included chain lengths are $C_{16}$ and $C_{18}$. It has now been discovered that the typical blend of saturated fat and trans fat can be replaced by a mixture of saturated fat, unsaturated fat, and an emulsifier that contains high levels of diglycerides such as the HiDi type emulsifiers. The resulting blend of fats and HiDi emulsifier contains significantly less than 0.5 g of trans fat per serving of 14 g while margarines from partially hydrogenated fats that are now commercially available contain as much as 2.8-4.0 g of trans fat per 14 g serving for margarines containing 80% fat. Therefore, the final food product containing the emulsifier of this invention can be labeled to have zero trans fat according to current FDA regulations.

Figure 1:
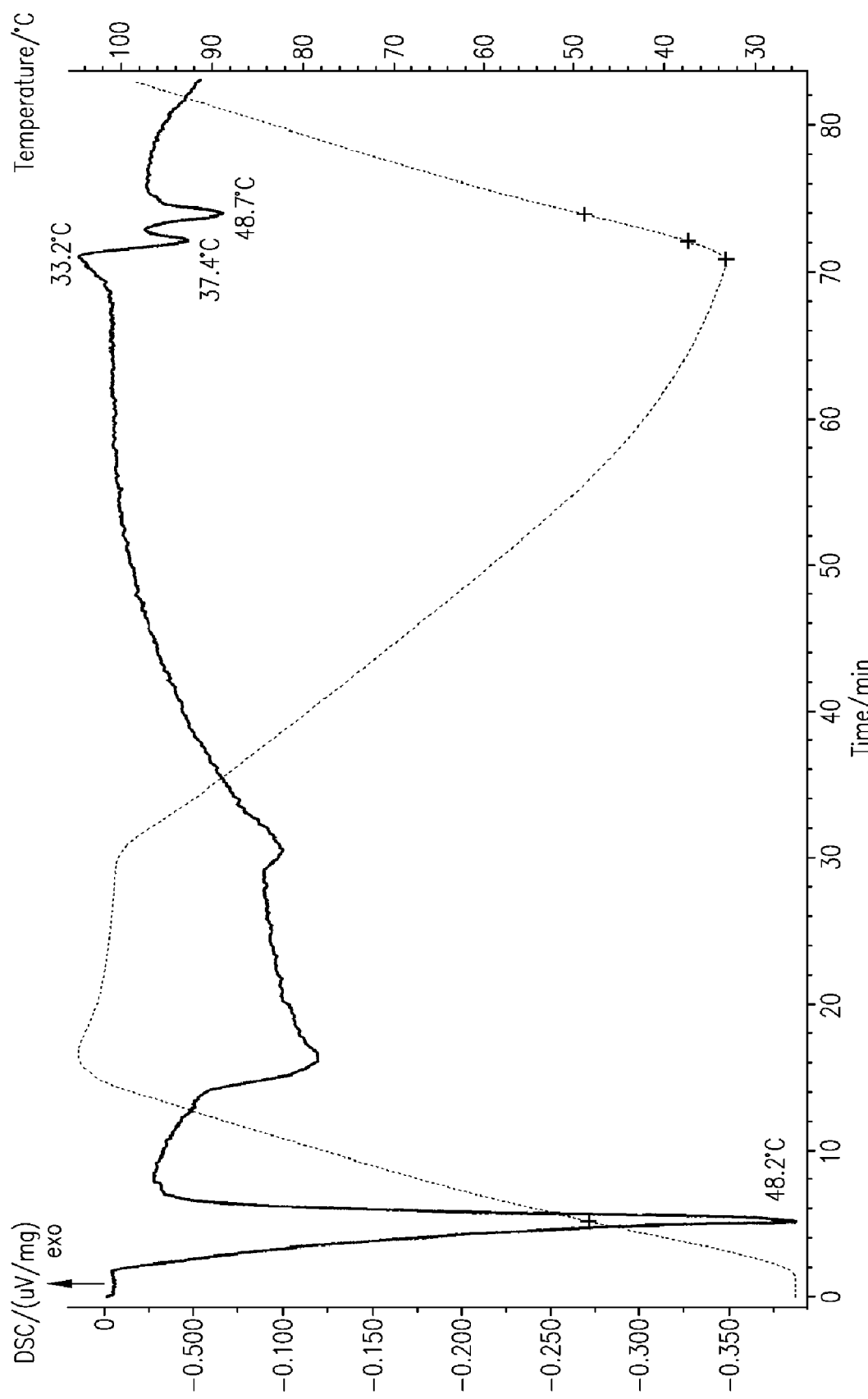
FIG. 1 is a graph of a DSC melting point analysis of an aged sample of a commercial puff pastry margarine prepared from partially hydrogenated fats and containing trans fat.

The graphs are of tests conducted on a NETZSCH STA 409 PG/PC Instrument.

DETAILED DESCRIPTION OF PREFERRED EMBODIMENT

The glycerides used to prepare a margarine for puff pastry use are preferably produced by interesterification of $C_{12}$-$C_{22}$ and preferably $C_{16}$-$C_{18}$ fat in the presence of glycerin and a catalyst such as calcium or sodium hydroxide. After the interesterification reaction, the catalyst is inactivated by addition of phosphoric acid and the excess glycerin is removed by distillation under vacuum. The interesterification reaction may also be carried out in the presence of an appropriate enzyme as the catalyst. The glycerin to fat ratio is selected to give a mono- and diglyceride emulsifier w/w that falls within the parameters of Table I below.

TABLE I

Fatty acids $C_{12}$-$C_{22}$, preferably >80% $C_{16}$-$C_{18}$
Monoglycerides <30%; preferably <20%; most preferably about 10% or less
Diglycerides >60%; preferably >65%; most preferably about 70% or higher
Triglycerides being the remainder Alternately, the selected fat may be interesterified in the presence of glycerin and a catalyst such as calcium or sodium hydroxide. After the interesterification reaction the catalyst is inactivated by addition of phosphoric acid and the excess glycerin is removed by an appropriate procedure such as distillation under vacuum. As a further alternative, a selected fatty acid may be esterified in the presence of glycerin and a catalyst such as calcium or sodium hydroxide. After the esterification reaction the catalyst is inactivated by addition of phosphoric acid and the excess glycerin is removed by an appropriate procedure such as distillation under vacuum. The interesterification or esterification reaction may also be carried out in the presence of an appropriate enzyme as the catalyst. The glycerin to fat ratio is picked to give a maximal level of monoglycerides. The resulting mono and diglyceride portion is subjected to distillation under vacuum to separate most of the monoglyceride component from the diglyceride component, to again provide an emulsifier that is within the parameters of Table I.

Example 1

Fully hydrogenated soybean oil was interesterified with excess glycerin (ratio of three moles of glycerin to one mole of fat) in the presence of calcium hydroxide as the interesterification catalyst. After the reaction was completed phosphoric acid was added to inactivate the catalyst and the excess glycerin was removed by distillation under vacuum. The resulting mono- and diglyceride was subjected to distillation in a short path still to remove monoglycerides. The residual portion consisted of a new mono- and diglyceride portion having the following composition, w/w:

TABLE II

| | |
|---|---|
| Monoglyceride | 10.9% |
| Diglyceride | 73.5% |
| Triglyceride | 15.6% |
| Iodine Value | 2.8 |

In lieu of soybean oil, other vegetable oils may be used for the preparation of the high diglyceride emulsifier, including, but not limited to, canola oil, coconut oil, corn oil, cottonseed oil, flaxseed oil, palm oil, palm kernel oil, peanut oil, safflower oil, sesame oil, and sunflower oil.

Functionality of puff pastry margarine depends on the emulsifier having a consistency equal to that of the dough being laminated. The required consistency can be achieved by a combination of a proper formulation and a proper process to produce the margarine. The formulation of this invention involves a blend of saturated and unsaturated fats that possess a particular solid fat content profile and a beta prime-tending crystallization pattern. Processing requires that the fat composition be crystallized into a stable form with the necessary plasticity and a beta prime crystal profile. The processing is preferably accomplished in a scraped surface heat exchanger which combines removal of heat as well as a proper amount of shear. Such processing conditions are known to those skilled in the art of margarine production.

Generally the puff pastry emulsifier will consist of monoglycerides, diglycerides and triglycerides. Monoglycerides will be present in the emulsifier at a concentration w/w of from about 5-30%, diglycerides are present at a level of at least about 65% to about 80%, with the remainder being triglycerides. Preferably, the emulsifier is prepared from about $C_{12}$-$C_{22}$ saturated fatty acids, and most desirably from about $C_{14}$-$C_{18}$ fatty acids, and contains about 10% monoglycerides and from about 65-75% diglycerides. Most preferably the fatty acids will be from about $C_{16}$-$C_{18}$.

The present invention involves blending a selected vegetable oil with the high diglyceride mono- and diglyceride emulsifier having at least about 65% to about 80%, more preferably from about 70% to about 80%, and most preferably about 74% of diglycerides. The high diglyceride emulsifier is combined with a sufficient quantity of vegetable oil and an amount of saturated fat to yield a semi-solid, self-sustaining emulsifier having a fat content profile similar to commercial puff pastry margarines made with partially hydrogenated fats or oils. The high diglyceride-containing margarine is preferably formulated to have a solid fat content somewhat lower than margarines made with partially hydrogenated fats. The solid fat content is preferably determined using a Bruker solid fat content analyzer using NMR technology. The procedures for determining such solid fat content profiles are known to those skilled in the art (AOCS method number cd-16-81).

In general, different non-hydrogenated vegetable oils are blended with the high diglyceride emulsifier at different ratios as required to produce a margarine with the desired semi-solid fat content profile. Exemplary formulations include:

TABLE III

| Preparation of high diglyceride Formulation 1 (w/w): | |
|---|---|
| Refined, bleached, deodorized palm oil | 51.55% |
| Soybean oil | 14.73% |
| High diglyceride emulsifier | 13.58% |
| Water | 17.10% |
| Salt | 3.00% |
| Citric acid | 0.007% |

The mixture was melted at 65-70° C. and votated in an Armfield model FT 25 Continuous Margarine Crystallizer to a temperature of 23° C.

TABLE IV

| Preparation of high diglyceride Formulation 2 (w/w): | |
|---|---|
| Refined, bleached, deodorized palm oil | 38.87% |
| Soybean oil | 27.00% |
| High diglyceride emulsifier | 14.00% |
| Water | 17.10% |
| Salt | 3.00% |
| Citric acid | 0.007% |

The mixture was melted at 65-70° C. and votated in an Armfield model FT 25 Continuous Margarine Crystallizer to a temperature of 23° C.

Solid fat content profiles for a commercial trans-containing margarine and the two different high diglyceride margarine Formulations 1 and 2 of Tables III and IV are listed in Table V.

TABLE V

| | % Solid Fat, w/w | | |
|---|---|---|---|
| Temperature ° C. (° F.) | Commercial trans-containing | High Diglyceride Formulation 1 | High Diglyceride Formulation 2 |
| 10 (50) | 51.23 | 49.74 | 35.96 |
| 20 (68) | 40.01 | 37.81 | 28.27 |
| 30 (86) | 26.11 | 25.67 | 20.89 |
| 35 (95) | 19.20 | 20.27 | 16.67 |
| 40 (104) | 12.51 | 14.21 | 11.52 |

Puff pastries contain a high fat content that consists of a solid, crystalline, component and a greater liquid component. The SFC profiles show that at 30° C. the solid component is from about 20% to about 25%. The liquid component is from about 80% to about 75%. If the liquid component is not encapsulated by the solid component the product will be unpleasantly oily. Encapsulation requires that the crystals of the solid component have adequate surface area. Because of their large size (up to 50 microns) beta crystals are not able to effectively encapsulate enough of the oil to be effective. The smaller size of the beta prime crystals (about 5 microns) provides sufficient solid surface area to effectively encapsulate the liquid oil as is required for product functionality. Beta prime is a smooth, small, fine crystal, whereas beta is a large, course, grainy crystal.

Conclusive differentiation of beta crystals from beta prime crystals requires the use of x-ray diffraction. An alternative approach to differentiation of crystal types is the use of a differential scanning calorimeter (DSC), which identifies crystals by their melting point. A typical heat flow differential scanning calorimeter has two heating discs that are in thermal contact with one another and are isolated from the surrounding environment. A metal pan is placed on each disc. One of the pans contains a sample to be tested, while the other is an empty reference pan. By heating both pans at a controlled, known rate, and measuring the heat flow or energy transfer between them, resulting from the differential in heat capacity of the reference pan and the sample, the thermal transition in the material contained in one of the pans is measured. The magnitude of difference is shown on the graph expressed as $\mu V/mg$ between the empty pan and the pan with the sample in the DSC. The temperature at which the maximum energy difference occurs is referred to herein as a DSC-defined melting point.

Beta prime crystals are known to have lower melting points than beta crystals from the same fat and the DSC has sufficient resolution to accurately determine several melting points in mixtures of crystals. In addition, the DSC has the capability of measuring the melting points of a fat sample that has been aged for some time. Once the crystals have been melted, the temperature is raised further to erase the crystal memory of the sample. The sample is then cooled to recrystallize the product. The freshly crystallized sample is then remelted.

This sequence of treatments demonstrates the extent to which the crystals have a tendency to transition from lower melting forms such as beta prime to higher melting forms such as beta. FIG. 1 shows the DSC analysis of an aged sample of a typical commercial puff pastry margarine prepared from partially hydrogenated fats and containing trans fats. In FIG. 1, the dotted line represents the temperature profile, while the solid line is the $\mu V/mg$ curve. The temperature curve rises as the sample is initially heated as indicated by the increase of the energy curve, then declines as the sample is allowed to cool, and then rises again during the second heating cycle. The initial melting point of the sample of FIG. 1 was 48.2° C., which occurred in about 10 minutes after commencement of heating of the sample. This low melting point verified that the crystals were in beta prime form in that the measured temperature is lower than would be expected for higher melting point beta crystals. The sample was maintained in a melted condition for about 30 minutes, and then allowed to cool over a time interval of about 60 minutes. The sample was then immediately reheated, with two peaks being observed, one at 37° C. and the second at 48° C. These low melting points confirmed that the beta prime crystals formed during manufacture did not transition to higher melting beta form over time.

Figure 2:
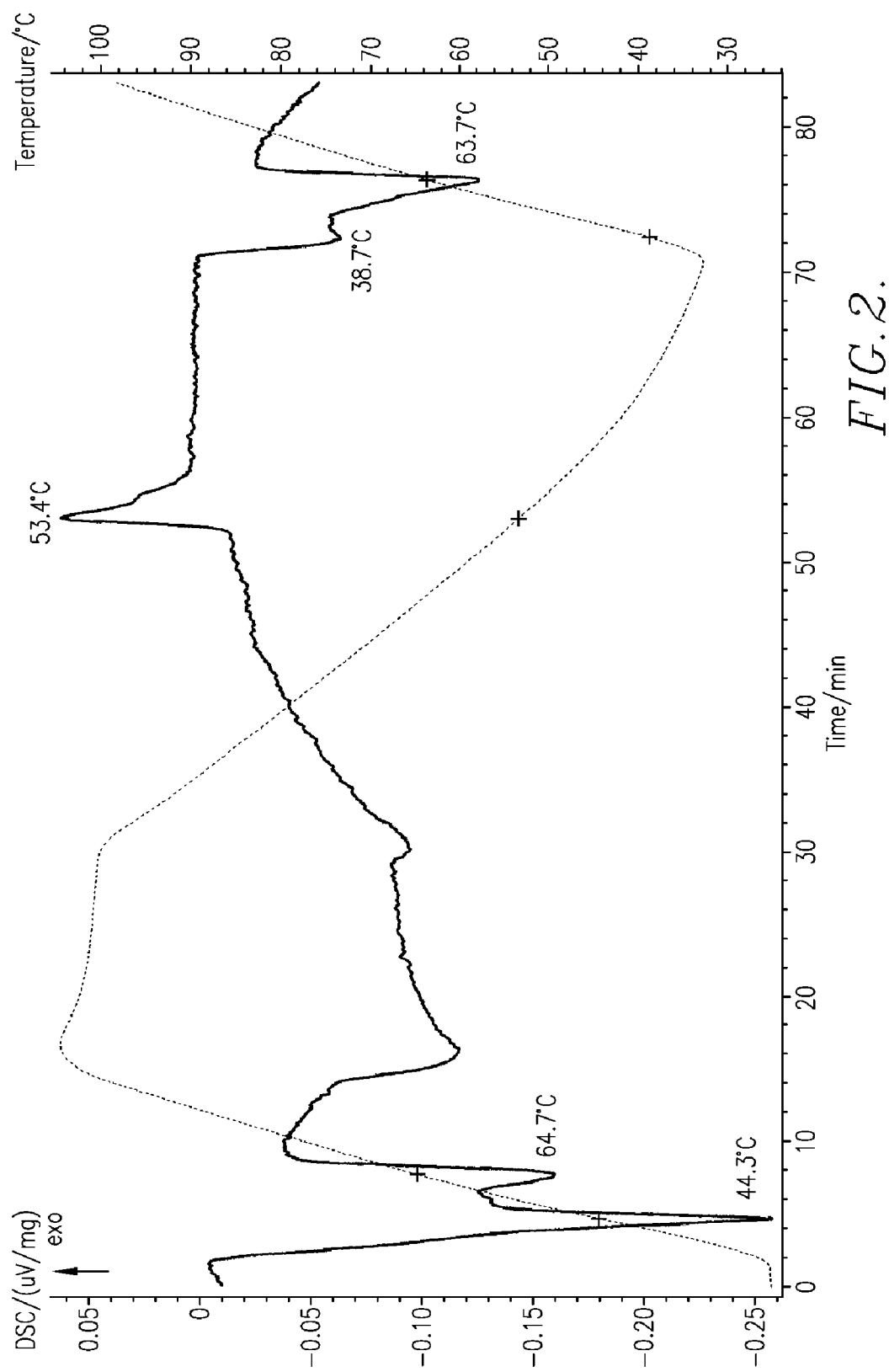
FIG. 2 is a graph of a DSC analysis of an aged margarine product containing a HiDi type emulsifier having minimal trans fat, and showing that beta prime crystals are stable over time and do not readily transition to higher melting, less desirable beta crystals.

A similar analysis of the margarine produced from the combination of the HiDi emulsifier and non-hydrogenated vegetable oils of this invention, as depicted in FIG. 2, shows that an aged product contains the same crystal types that are present immediately after crystallization. This observation confirms that the beta prime crystals present in the high diglyceride margarine are stable over time and do not readily transition to the higher melting, less desirable beta crystals.

The HiDi emulsifier is especially adapted for preparation of a puff pastry margarine in that the HiDi is predominantly, if not always totally, in the beta prime crystal form.

Example 2

Puff Pastry Preparation

The true test of puff pastry margarine is the ability to produce an acceptable puff pastry product. The formula for a typical puff pastry is:

| | |
|---|---|
| Bread Flour | 1500.00 g |
| Monocalcium Phosphate | 11.30 g |
| Salt | 11.30 g |
| Puff Pastry Margarine | 150.00 g |
| Water | 825.00 g |

The ingredients are mixed in a standard dough mixer for one minute at low speed and 5 minutes at high speed. Dough temperature after mixing should be in the range of about 68-72° F.

The dough is rolled to a thickness of about 3 mm. 1050.00 g puff pastry margarine is rolled to the same thickness and placed on the center one-half of the rolled dough. Outside strips of the dough are folded over the margarine and the center seam is sealed. The dough is folded into thirds and re-rolled to 3 mm. The dough is then folded into fourths and again re-rolled to 3 mm. These steps are repeated twice to generate 128 fat layers. The layered dough is then cut into pieces that are approximately 10×15 inches. The individual pieces should weigh about 100 g each. These pieces are placed on a bakery sheet pan, covered with a plastic bag, and frozen at 5° F. for at least two hours. The dough is allowed to retard at room temperature for 30 minutes, and then baked at 375° F. for 17 minutes.

The above procedure was used to produce puff pastry with a commercial margarine from partially hydrogenated fat, high diglyceride margarine Formulation 1 and high diglyceride margarine Formulation 2.

The results obtained were:

| | |
|---|---|
| Commercial margarine | 3.75 in. height |
| High diglyceride Formulation 1 | 3.84 in. height |
| High diglyceride Formulation 2 | 3.80 in height |

These results show that puff pastry margarine made with unhydrogenated fats and a saturated high diglyceride emulsifier can produce a puff pastry product equal in quality to that of a standard commercial product produced with partially hydrogenated fat.

In lieu of soybean oil, other vegetable oils may be used including, but not limited to, canola oil, coconut oil, corn oil, cottonseed oil, flaxseed oil, palm oil, palm kernel oil, peanut oil, safflower oil, sesame oil, and sunflower oil may be used as the vegetable constituent in preparation of the margarine formulations.

Nutritional analysis of margarines (w/w):

|  | Commercial trans-containing | High Diglyceride Formulation 1 | High Diglyceride Formulation 2 |
|---|---|---|---|
| Total fat | 80.0 | 79.2 | 79.1 |
| Saturated fat | 24.4 | 40.4 | 37.2 |
| Trans fat | 21.8 | 0.9 | 0.5 |
| Mono-unsaturated fat | 18.7 | 22.7 | 21.7 |
| Poly-unsaturated fat | 15.1 | 15.1 | 19.7 |
| Saturated fat + trans fat | 46.2 | 41.3 | 37.7 |

Other non-hydrogenated vegetable oils may be combined with the HiDi emulsifier to prepare a margarine for use in puff pastry products including, but not limited to, canola oil, coconut oil, corn oil, cottonseed oil, flaxseed oil, palm oil, palm kernel oil, peanut oil, safflower oil, sesame oil, soybean oil, and sunflower oil may be used as the vegetable constituent in preparation of the high diglyceride emulsifier. Alternate saturated fats that may be substituted for palm oil in the margarine formulation include soy sterine, palm sterine, and hydrogenated soy oil.

The ratio of HiDi to saturated fat for preparation of the emulsifier on a w/w basis is about 10% HiDi to about 20% saturated fat, preferably about 12% HiDi to about 24% saturated fat, and most preferably about 14% HiDi to about 28% saturated fat.

The ratio of the HiDi emulsifier to vegetable oil on a w/w basis to prepare a margarine should be about 10% emulsifier to about 45% non-hydrogenated vegetable oil, preferably about 12% emulsifier to about 42% non-hydrogenated vegetable oil, and most preferably about 14% emulsifier to about 38% non-hydrogenated vegetable oil.

We claim:

1. A puff pastry margarine comprising:
   from about 10% to about 16% of an emulsifier, said emulsifier comprising a mixture of mono-, di- and triglycerides that is the interesterified reaction product of glycerin and a fully saturated fat source, in which the diglyceride portion of the emulsifier is at least about 65%;
   from about 55% to about 65% of a non-hydrogenated vegetable oil; and
   from about 13% to about 25% of a saturated fat, said emulsifier mixture being predominantly in beta prime crystal form.

2. A puff pastry margarine as set forth in claim 1, wherein the diglyceride portion of the emulsifier mixture is from about 70% to about 80%.

3. A puff pastry margarine as set forth in claim 1, wherein the diglyceride portion of the emulsifier mixture is about 74%.

4. A puff pastry margarine as set forth in claim 1, wherein is provided from about 12% to about 14% of the emulsifier, from about 55% to about 65% of the non-hydrogenated vegetable oil, and from about 15% to about 27% of the saturated fat.

5. A puff pastry margarine as set forth in claim 1, wherein the non-hydrogenated vegetable oil is selected from the group consisting of canola oil, coconut oil, corn oil, cottonseed oil, flaxseed oil, palm oil, palm kernel oil, peanut oil, safflower oil, sesame oil, soybean oil, and sunflower oil.

* * * * *

UNITED STATES PATENT AND TRADEMARK OFFICE
CERTIFICATE OF CORRECTION

PATENT NO. : 7,687,096 B2 Page 1 of 1
APPLICATION NO. : 11/279730
DATED : March 30, 2010
INVENTOR(S) : Skogerson et al.

It is certified that error appears in the above-identified patent and that said Letters Patent is hereby corrected as shown below:

Title page, item 73 the Assignee address reading "Lenexz, KS" should read: --Lenexa, KS--

Signed and Sealed this

Twenty-third Day of November, 2010

David J. Kappos
*Director of the United States Patent and Trademark Office*